United States Patent
Flaxer et al.

(10) Patent No.: US 7,552,078 B2
(45) Date of Patent: Jun. 23, 2009

(54) ENTERPRISE PORTFOLIO ANALYSIS USING FINITE STATE MARKOV DECISION PROCESS

(75) Inventors: David Flaxer, Dobbs Ferry, NY (US); Paul Gregory Greenstein, Croton-on-Hudson, NY (US); Robert Cornelius Hampshire, Lima, OH (US); Anil Nigam, Stamford, CT (US); John George Vergo, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 536 days.

(21) Appl. No.: 11/067,219

(22) Filed: Feb. 28, 2005

(65) Prior Publication Data
US 2006/0195373 A1    Aug. 31, 2006

(51) Int. Cl.
*G06Q 40/00*    (2006.01)
(52) U.S. Cl. .......................... 705/36 R; 705/35; 705/37
(58) Field of Classification Search ................... 705/35, 705/36 R, 37, 38
See application file for complete search history.

(56) References Cited

U.S. PATENT DOCUMENTS

| | | | | |
|---|---|---|---|---|
| 6,061,662 A | * | 5/2000 | Makivic | 705/36 R |
| 6,832,210 B1 | * | 12/2004 | Li | 705/36 R |
| 7,010,510 B1 | * | 3/2006 | Schellhorn | 705/36 R |
| 7,236,952 B1 | * | 6/2007 | D'Zmura | 705/36 R |

OTHER PUBLICATIONS

Mullin, Rick, "Putting the P in ERP" Dec. 24, 1997, Chemical Week, vol. 159, Issue 48, P19.*
Anonymous, "Spotlight on R&D: Software Systems Oversee Quality Control" May 3, 1999, Asia Computer Weekly, p. 1.*
Anonymous, "NEC Systems Inc. Launches Product Data Management Software Suite for North American Market" Sep. 14, 1999, p. 1.*

* cited by examiner

*Primary Examiner*—Alexander Kalinowski
*Assistant Examiner*—Kelly Campen
(74) *Attorney, Agent, or Firm*—Whitham, Curtis, Christofferson & Cook, PC; Stephen C. Kaufman (57) ABSTRACT

Generating a transition plan for a computer resource portfolio, representing each resource as a state machine, by generating a transition plan, the transition plan having a set of acts for transitioning states of the resources, to move the computer resource portfolio from a present state, the present state based on an inventory of present computer capabilities, to a future state. The future state is identified based on a difference between a present state and an identified state meeting given performance requirements. The transition plan is optimized to maximize the sum value of the computer resource portfolio values added over the state sequence of the transition.

3 Claims, 9 Drawing Sheets

Application Life Cycle

State Transitions

Figure 6a
Retain

Figure 6b
Retire

Figure 6c
Restructure

ENTERPRISE PORTFOLIO ANALYSIS USING FINITE STATE MARKOV DECISION PROCESS

BACKGROUND OF THE INVENTION

1. Field of the Invention

The present invention generally relates to enterprise portfolio management and, more particularly, to the development of a set of recommendations in the form of a transition plan for the transition of the enterprise portfolio computer and software resources during each phase of the planning horizon.

2. Background Description

Figure 9:
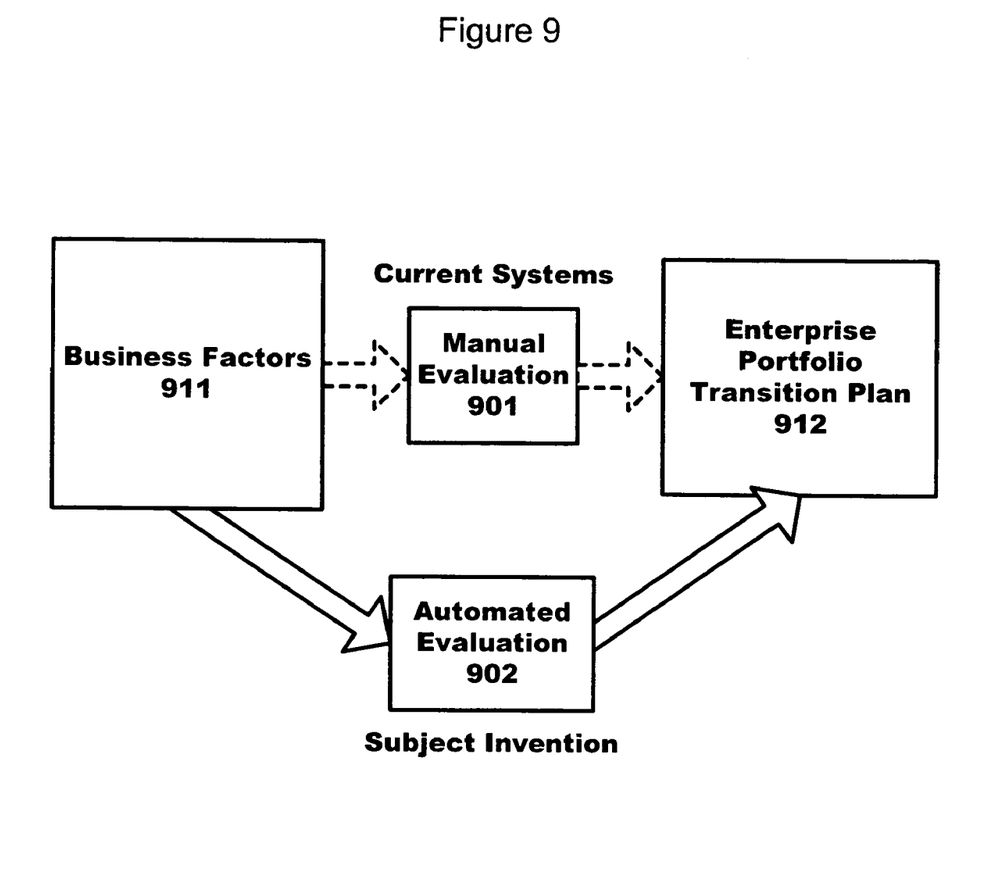
FIG. 9 is an illustration of the current method of transition management compared with the subject inventions approach to transition management.

Managing a portfolio of computer and software resources in a sufficiently large business enterprise is a complicated and daunting task involving an analysis of a myriad of factors to include business capabilities, business value and business risk. Such factors are often both competing and interlocked which makes it especially difficult to identify an optimal portfolio transformation/evolution plan over a given time duration. Portfolio transformation recommendations may be based on: business value and cost; adherence to functional requirements of the enterprise architecture; business risks; computer and software resources life cycles; and, interoperability and incompatibility amongst the portfolio computer and software resources. This effort is traditionally performed as a manual evaluation 901 as shown in FIG. 9. The business factors 911 which must be considered in order to develop a comprehensive enterprise portfolio transition plan 912 include but are not limited to the business values, business risks, enterprise architecture strategic objectives, and co-dependencies and interoperability between portfolio members. This manual evaluation 901 can become an impossible task as the numbers of portfolio members grows. Thus, the invention provides an automated evaluation 902 for developing and optimizing an enterprise portfolio of computer and software resources transition plan 912.

Presently, no deterministic techniques exist for automation of enterprise portfolio transition management. Investment decisions into computer and software resources are currently not treated as formally as other business investments. This lack of formalism may lead to excess investment and computer and software resources that do not support the business objectives or insufficient investment in computer and software resources, resulting in loss of business competitiveness.

SUMMARY OF THE INVENTION

A finite horizon discrete time Markov decision process (MDP) is developed to model enterprise portfolio transformation. The MDP is a model for executing sequential decision making. The key elements of an MDP are states, actions and rewards. A state is a quantity that describes an essential characteristic of the problem. In this case the state is the life cycle phase of all of the members in the portfolio considered collectively. In general, the state dynamics may be governed by a probability distribution and actions. The actions are made on a time set called a decision period. These periods are assumed fixed and known a priori. The probability distribution specifies the chance of the state moving to a different value during a decision period. The actions influence the probability of the state transitions. The actions are the decisions which are made that affect the state dynamics. A reward is associated with an action and state transition. The decision maker would like to select a sequence of actions which maximizes the sum of the returns.

As the name suggests the model depends heavily on the Markov assumption. The Markov assumption is that the state evolution only depends on the present state and is independent of the past evolution of the state. Analogously, the Markov assumption requires that the rewards obtained for selecting a certain action in a given state only depend on the current state and are independent of the prior history of the state.

In the context of enterprise portfolio selection, the state of the process is the vector representing the life cycle phase of each of the members in the portfolio. For this invention, the members of the portfolio are the computer and software resources that meet a set of restrictions. The computer and software resources applicable to the invention are those resources that have a definable business value, a related business risk, are co-dependent with the other members of the portfolio, and are managed across a life cycle defined by states. The state of the MDP is a collection of individual state processes. The state is taken to be a discrete approximation of the continuous lifecycle of a resource. The state evolutions of the members in the portfolio are related via the actions.

For the purposes of this invention, the term computer and software resources is used to describe the members of the portfolio. However, it should be understood that the members of the portfolio could be either computer or software resources or both computer and software resources. For simplicity, the term computer and software resources or just resources is used throughout the description of the invention embodiment.

An action for this model is a vector, called "resource actions," representing the action taken on each of the resources in the portfolio. The collection of resource actions at a given time is called a portfolio action.

When a resource action is taken, a reward is received. The reward for an action in portfolio selection is the business value received by carrying out the action. This reward may be a cost benefit. Each of the computer and software resources in the portfolio has an action applied to it. Each resource contributes to the business value. The reward obtained from a resource action is called a resource reward. The business reward is the sum of the resource rewards. The resource rewards may be random. It is assumed that the resource rewards have a normal distribution. Thus the business reward is the sum of normal random variables.

It is assumed that the resource rewards are correlated. This is to say that the business value contribution of a computer and software resource may depend on the state of other computer and software resources in the portfolio. This is intended to model the interoperability and incompatibles that surely exist between resources. These synergies, if leveraged, provide increased business value. This idea captures the notion that the business value of the sum of the resources may be greater than the sum of business values of the individual computer and software resources. The portfolio manager would like to take advantage of all such value fusion opportunities.

Existence of the enterprise architecture (EA) is assumed. Adherence of a computer and software resources to the EA is known a priori. The preference to conform the portfolio to the EA is modeled as a reward derived at the end of the planning horizon. If a computer and software resource is not EA compliant then the final reward or salvage function places very low value on the resource being mature at the final time and places a high value on the resource being retired at the final time. On the other hand, if a computer and software resource is EA compliant then the final salvage function places high value on the retention of the resource in the portfolio.

It is assumed that the initial state of the portfolio is known. It is also assumed that the salvage function for each of the computer and software resources is known a priori. This is a part of an assessment process which is assumed to be complete. Knowledge of the salvage function assumes that all current and potential computer and software resources in the portfolio have been evaluated for EA compliance.

The portfolio manager would like to maximize the business value while insuring that the chance of a large loss of business value is small. Risk adjusted business value is a measure of how much of the business value is at risk given a portfolio action. It is assumed that the risk adjusted business value is additive. That is, total risk adjusted business value (RABV) is the sum of the risk adjusted business value received during each decision period in the planning horizon.

It is therefore an object of the present invention to provide a sequence of portfolio actions which maximizes the discounted risk adjusted business value and provide automatic generation of a transition plan for enterprise portfolio transition management within an enterprise which reflects the optimized RABV for the enterprise.

It is a further object of the invention to define a relationship between computer and software resources in the portfolio and financial aspects of the business. The discounting factor measures how much the enterprise prefers business value gains today over business value gains tomorrow.

It is another object of the invention to use this relationship to incorporate computer and software resource life cycle dynamics to define the sequence of actions in terms of transitions across the life cycle states.

An additional object of the invention is to consider interoperability and incompatibilities amongst computer and software resources within the portfolio to refine the business value and ensure adherence with the enterprise architecture.

According to the invention, there is provided a computer based methodology and system that evaluates current capabilities, called AS IS features, and future requirements, called TO BE requirements, of the computer and software resources within an enterprise's portfolio. The AS IS features are obtained from a manual assessment of the existing computer and software resources. The TO BE requirements are developed from an analysis of the enterprise strategic goals to create the target performance capabilities of the computer and software resources within the portfolio. These future requirements may apply to existing resources or may include the incorporation of computer and software resources not yet part of the enterprise portfolio.

Upon analysis of the AS IS capabilities with the TO BE requirements, the methodology and related system will produce an optimized transition plan. The transition plan is optimized by analyzing business risks and costs relationships, interoperabilites and incompatibilities of members of the portfolio, adherence to enterprise architecture, life cycle state transitions probabilities, and other factors through a backward inductive technique applied to a set of recursive equations that have been developed to model the myriad of business factors that effect portfolio transition management of computer and software resources.

The key insight of this solution method is that actions taken today effect the actions that can be taken tomorrow. Fewer choices for the future could mean smaller value. The portfolio manager should not only select an action which maximizes the reward for today, but should optimize a balance of today's reward with the expected rewards of the future.

For the purposes of this invention, the enterprise may be a single company, a single department within a company (e.g., accounting, R&D, training, sales, etc.), a business concern that provides computing capabilities for a number of customers, or numerous other entities that manage computer and software resources. The invention is concerned primarily with the management and transition of IT applications within an enterprise portfolio. However, the enterprise portfolio computer and software resources, also referred to as portfolio members, may include hardware, software, firmware, and other assets that meet a set of restrictions. The invention restricts the automatic development of the enterprise portfolio transition plan to those computer and software resources that have a definable business value, a related business risk, are co-dependent with the other members of the portfolio, and are managed across a life cycle defined by states. That is, the computer and software resources can exist in any one of several developmental or operational states.

The enterprise portfolio computer and software resources may be any collection of off-the-shelf, custom, turnkey or combination of software capabilities within the enterprise as well as desktop, server, database, printer, facsimile, telecommunications, network and other computer hardware devices. Thus, the portfolio is a group of computer and software resources that are currently available for transformation.

BRIEF DESCRIPTION OF THE DRAWINGS

The foregoing and other objects, aspects and advantages will be better understood from the following detailed description of a single embodiment of the invention with reference to the drawings, in which.

DETAILED DESCRIPTION OF THE PREFERRED EMBODIMENTS OF THE INVENTION

Figure 1:
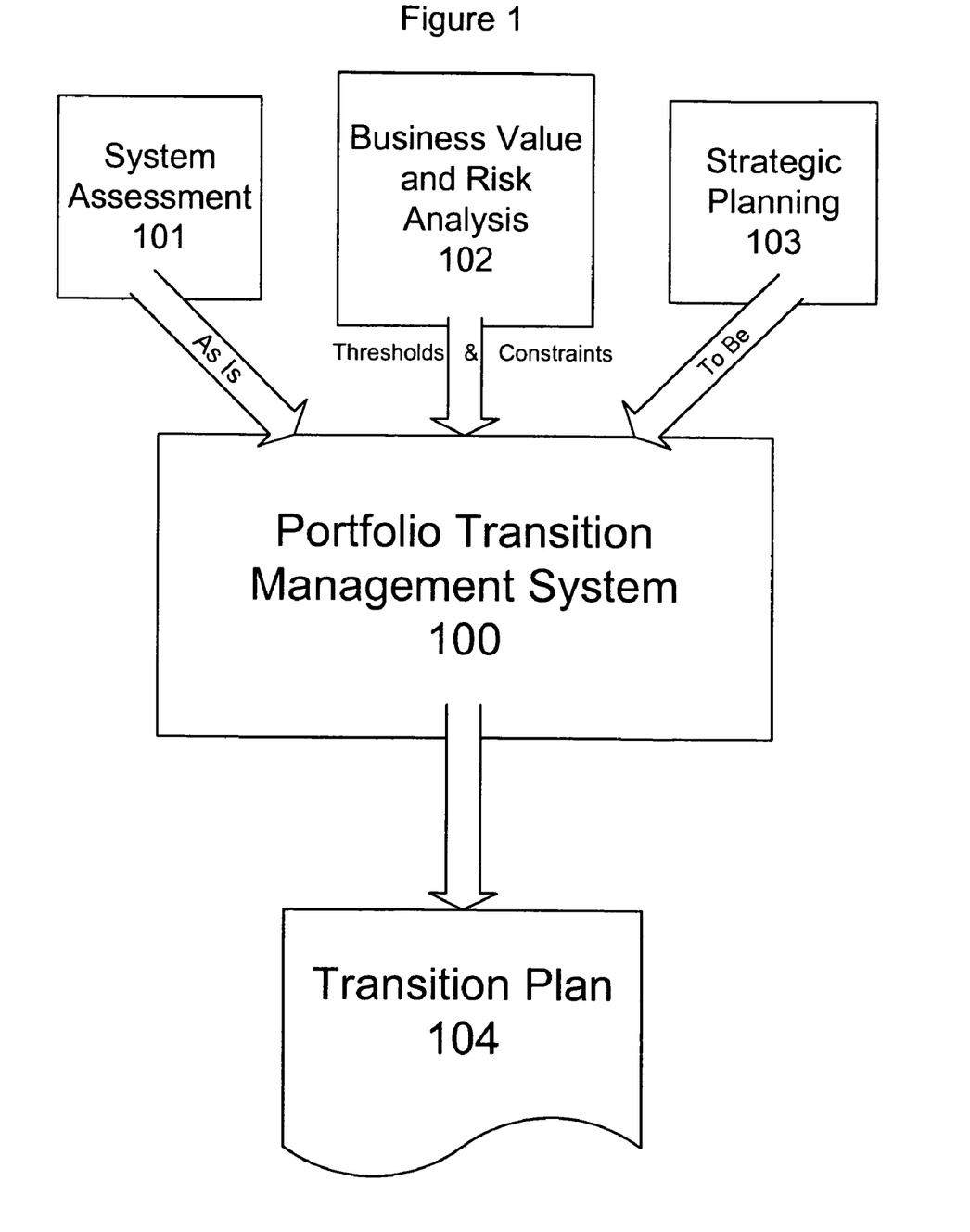
FIG. 1 is a simplified block diagram that expresses the major elements of the enterprise portfolio transition management of computer and software resources.

Referring now to the drawings, and more particularly to FIG. 1, there is shown the portfolio transition management system 100 according to the invention. The portfolio transition management system 100 analyses business tactical and strategic values to produce a Transition Plan 104 for the enterprise portfolio manager. A manual system, assessment 101 is performed by the transition manager or the organization responsible for transition management of computer and software resources within the enterprise to create an AS IS list of capabilities. This AS IS list of capabilities corresponds to the features and functions of each of the existing computer and software resources currently in the enterprise portfolio.

The transition manager or the organization responsible for transition management of computer and software resources within the enterprise also performs a business value and risk assessment 102 to define those thresholds and constraints that are used to refine the scope of the transition planning. In this embodiment, the business value is determined as a composite of: Revenue growth, Cost reduction, Link to business imperatives, Productivity enhancement, Competitive advantage, and Speed of benefit delivery. In another embodiment, a subset of these factors could be used or additional factors could be considered. While business risk is a measure of business impact as a probability of occurrence over a lifetime and, in this embodiment, can be defined as a composite of: Schedule Risks, Life cycle cost, Initial Costs, Feasibility risks, Reliability risks, Technical Risks (e.g., viruses, etc.), Management Risks, Security, and Technical obsolescence. In another embodiment, a subset of these factors could be used or additional factors could be considered.

Furthermore, the computational requirement of the dynamic programming algorithm grows twice as fast in the number of states as the number of actions. Thus the first approximation to the algorithm will prune the number of feasible states. An operational continuity constraint is introduced. This constraint assumes that the enterprise desires to remain operational throughout the entire portfolio transition management process. To reduce the computational effort needed to solve this problem, the following assumption can be made. It is assumed that an enterprise has a tolerance or threshold on the number of computer and software resources it is willing to change over a given decision period. That is, the enterprise is capacitated in some way. Because of constraints on funding, man power and management complexity, an enterprise may want to limit the number of projects that it is undertaking in a given decision period.

Finally, the enterprise must provide strategic planning 103 inputs which are analyzed by the portfolio transition management system 100 to derive the TO BE future requirements. These requirements are defined by a Salvage Function $\{S_j (X_n^i, a_n^i) | 0 \leq j \leq K\}$, where the elements of the expression are defined to capture the functional requirements of an enterprise architecture. They represent the risk adjusted business value (RABV) associated with each life cycle phase of a computer and software resource at the final time. The embodiment described here speaks to computer and software resources that currently exist within the enterprise. However, it is easily understood by those skilled in the art that future requirements could include requirements for computer and software resources not currently included in the enterprise portfolio.

Figure 2:
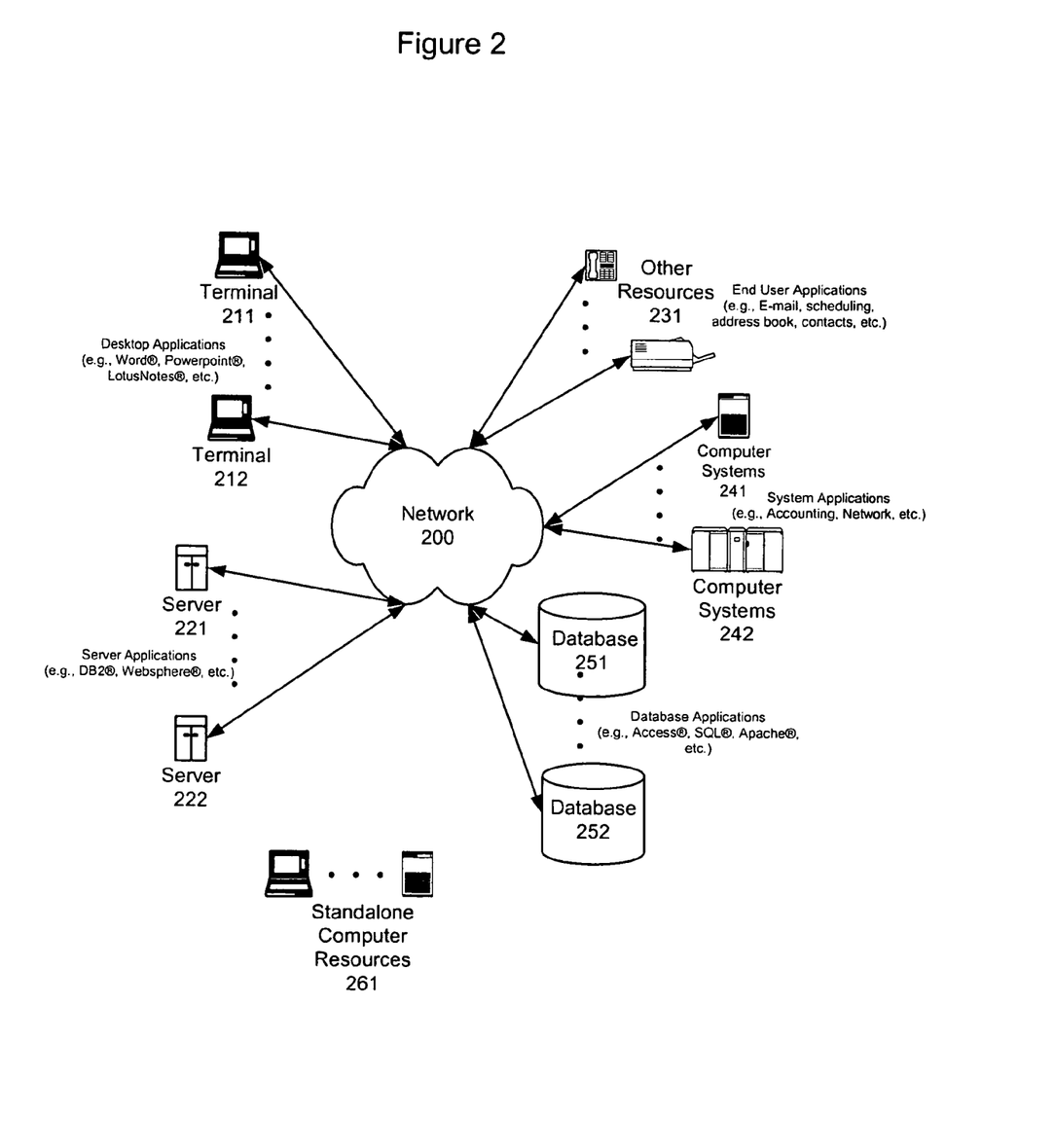
FIG. 2 is a system level diagram showing an example of the members of the portfolio of computer and software resources that are to be managed by the enterprise portfolio transition management system.

FIG. 2 provides an example of the computer and software resources that may be managed by the portfolio transition management system. The computer and software resources may be interconnected through a network 200. The network 200 is shown as a central network which interconnects computer and software resources. Those skilled in the art would understand that multiple local area networks, wide area networks, direct connections, and other connections could be implemented within the enterprise. Additionally, some of the computer and software resources to be managed could operate as standalone computer resources 261.

The portfolio transition management system would accommodate management of any number of different computer resources such as but not limited to desktop systems, laptop computers, servers, mainframe as well as ancillary devices (e.g., printers, facsimiles, telephones, and telecommunications equipment, etc.). In addition, the portfolio transition management system would address the transition management of customer enterprise solution applications (E.g., accounting, personnel, management, payroll, logistics and distribution, manufacturing, etc.) as well as off-the-shelf applications.

The computer and software resources may include terminals (211, 212) which run desktop applications (e.g., Word™, Powerpoint™, LotusNotes™, customer solution applications, etc.) and/or act as front end terminals for mainframe and other types of computer systems (241, 242) and servers (221, 222). The computer systems (241, 242) and/or servers (221, 222) may run common system or server applications (e.g., DB2™, Websphere™, accounting applications, product distribution applications, network management applications, customer developed solutions, etc.). The databases (251, 252) could be individual elements running database applications (e.g., Access™, SQL™, Apache™, customer developed applications, etc.) or could be configured within any of the other computer systems (241, 242) or servers (221, 222). Other computer and software resources 231, such as telephones, cellular telephones, personal display devices (PDAs), printers, faxes, etc, may run applications (e.g., e-mail, browser, address books, etc.) which may also be included in the portfolio transition management system.

Figure 3:
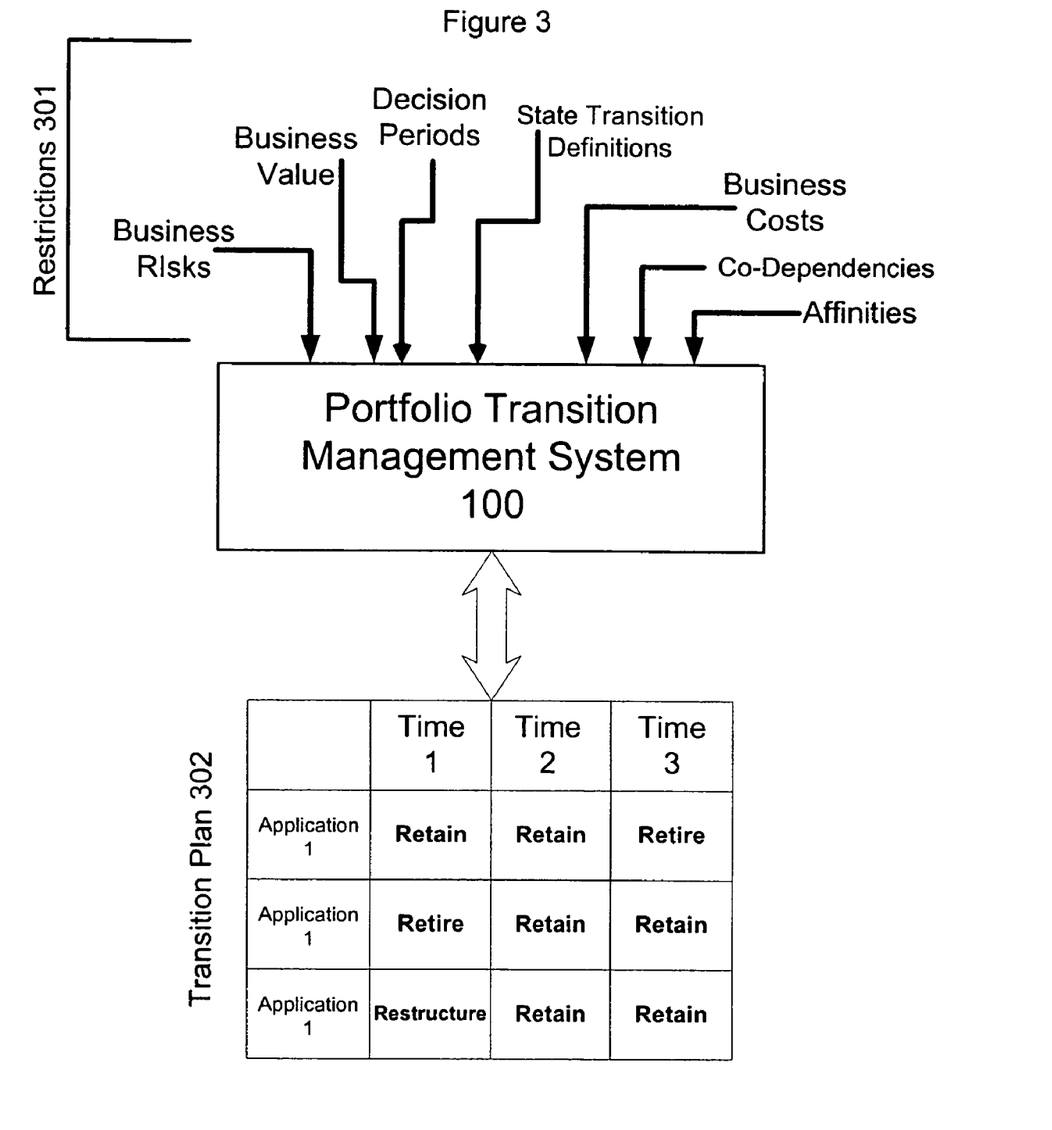
FIG. 3 illustrates an example of a transition plan and the restrictions on members of the portfolio transition management system.

FIG. 3 shows an example of the type of restrictions 301 that the portfolio transition management system 100 uses to select the computer and software resources for inclusion as members of the portfolio to be transitioned. These restrictions are used to distinguish the types of enterprise assets for which a transition plan 302 is created by the portfolio transition management system. The restrictions include but are not limited to the business risks, business values, decision periods, business costs, co-dependencies among computer and software resources, affinities, and that the resources are managed across a life cycle defined by state. Each member of the portfolio contributes to the overall business value.

The actions are made on a time set called a decision period. These periods are assumed fixed and known a priori. Thus, the decision period must be established and maintained as part of the transition data prior to the optimization of the transition plan 302.

The types of risks considered within the expression include: Schedule Risks, Life cycle cost, Initial Costs, Feasibility risks, Reliability risks, Technical Risks (viruses), Management Risks, Security, and Technical obsolescence. These risks can be examined across various Areas of Risks within an enterprise such as: Organizational Change and Management, Business, Data/Info, Technology, Strategic, Security, Privacy, and Project Resources as shown in Table 1. In another embodiment, a different set of areas of risk within an enterprise may exist.

TABLE 1

Example of Risk Assessment Inputs

| Area of Risk | Area Weight | Description | Probability of Occurrence over lifetime | Impact on Business (0-10) | Measure of Risk |
|---|---|---|---|---|---|
| Security | .2 | Virus | .3 | 2 | .6 |
| Business | .6 | Schedule slip 2 months | .2 | 5 | 1 |

Figure 4:
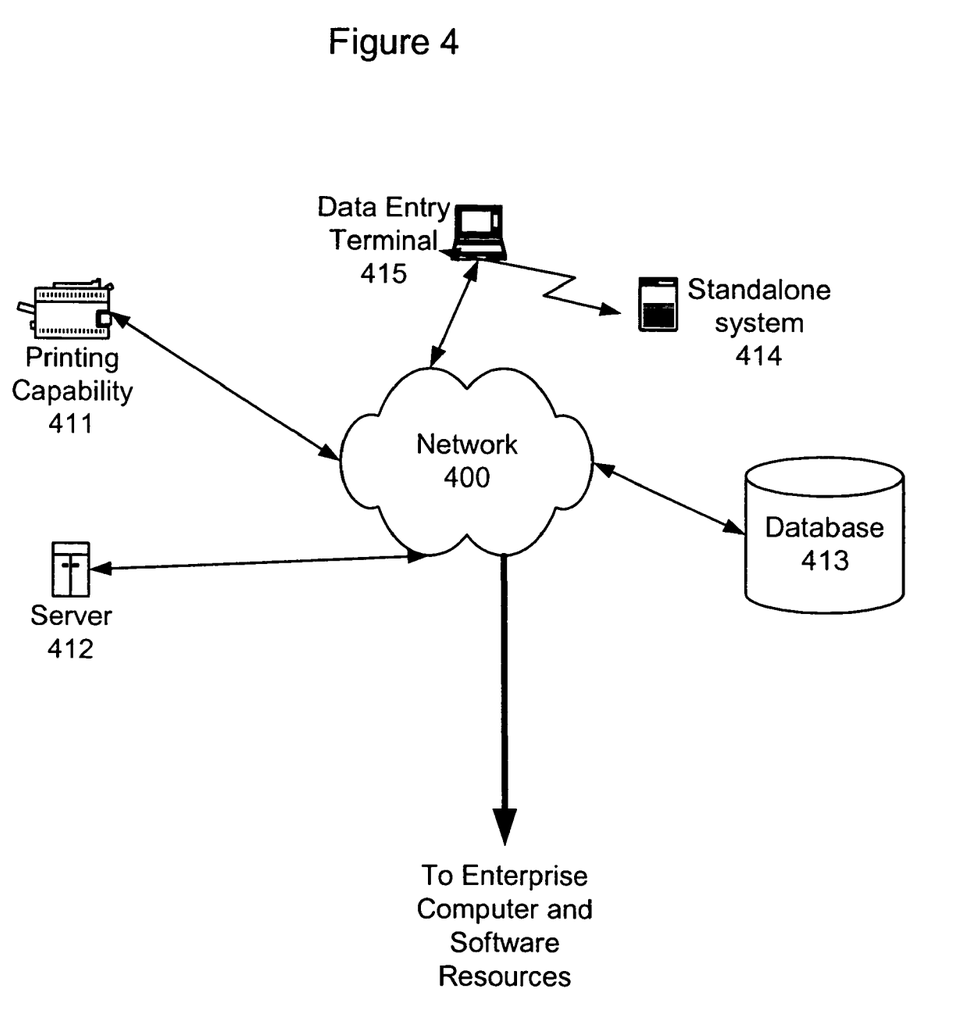
FIG. 4 illustrations the key elements of the computer-implemented portfolio transition management system.

FIG. 4 provides an illustration of the computers and network of computers that could be configured to implement the portfolio transition management system 100. It is desirable that the status and other data relative to the computer and software resources resides within the computers and networks of computers that communicate with the portfolio transition management system through electronic connections such as the network 200. In the event that the portfolio transition management system is implemented in a standalone configuration 414, the status and other data would be entered manually by the transition manager through a data entry terminal 415. Although the data inputs would be entered manually, the processing of the data and the optimization of the transition plan would be performed by the computing system. Due to the potential for thousands of computer and software resources to be transitioned across an entire enterprise, the transition planning of these resources is performed using computers and networks of computers illustrated by FIG. 4.

The algorithms and other process capabilities could reside in the server 412. The database 413 would be used to store the compiled data (AS IS, TO BE, transition planning data, and other data). The database 413 is shown as a separate element but could be storage within the server 412 or standalone system 414 or computers and networked computers available through the network 400. The transition plan could be distributed electronically through the network 400. Additionally, a printing capability 411 would be available to enable the transition plan to be printed as a document.

FIG. 4 is a simplified diagram showing only one server 412, one data entry terminal 415, one database 413 and one printing capability 411. However, it would be commonly understood by those skilled in the art that although capable of running in a single server 412 or standalone system 414, the portfolio transition management system processing, storage, reporting and printing capabilities could be distributed across multiple computers and networks of computers.

Figure 5:
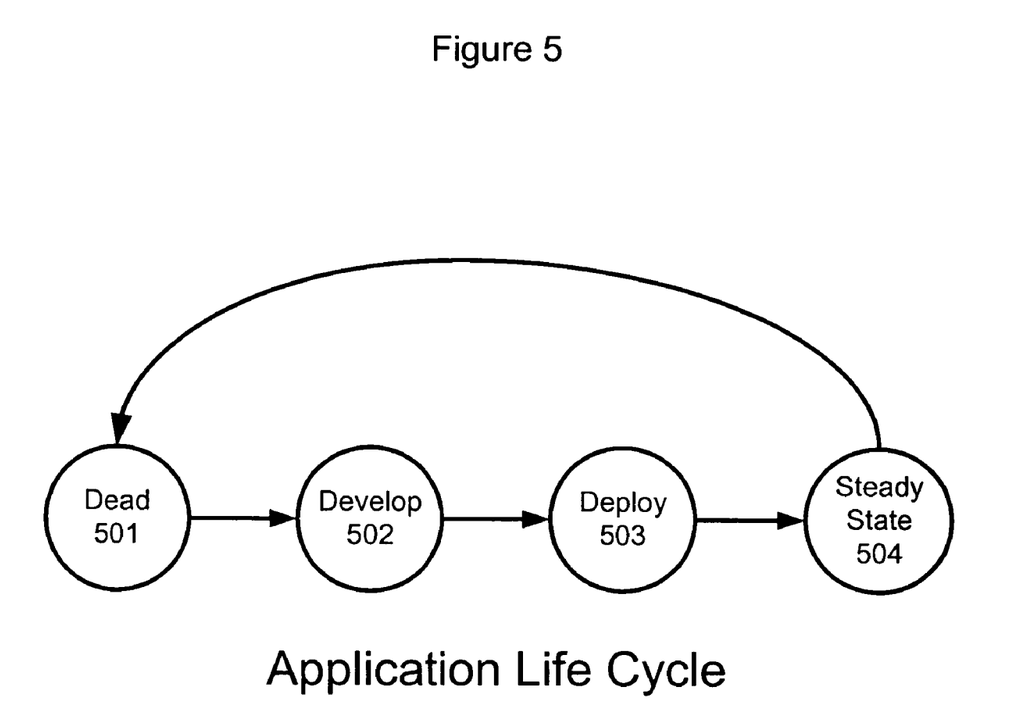
FIG. 5 is an illustration of the life cycle of the members of the portfolio of computer and software resources and the related states.

The life cycle of a computer and software resource is a major factor in how much a computer and software resource contributes to the business objectives of the enterprise. When a computer and software resource is early in its life cycle, e.g., undergoing development or deployment, then it may not contribute to business value at the same level as a mature, steady state, computer and software resource. FIG. 5 provides a discrete approximation of a computer and software resource life cycle.

The development phase 502 is when the computer and software resource is being created or being acquired. If the enterprise chooses an off the shelf product, then in the development phase the enterprise specifies requirements for the computer and software resource and creates selection criteria for purchasing the computer and software resource. If the enterprise decides to make a custom computer and software resource, then the development phase includes the design and implementation of the computer and software resource.

The deployment phase 503 encompasses the installation of the computer and software resource and the time it takes to get the resource functioning at the desired levels.

The steady state phase 504 represents the duration of time that the computer and software resource's functions are mature. The business value of a computer and software resource in steady state is the highest compared to the other life cycle phases.

In another embodiment, additional computer and software resource lifecycle states may exist.

To model the computer and software resource life cycle, let $\{X_n^i | n \geq 0\}$ be a discrete time Markov chain representing the life cycle of the i-th resource in the portfolio. It is assumed that a resource's life cycle phase is defined to be in one of the following 4 states: Dead 501, Develop 502, Deploy 503, or Steady State 504. The dead state 501 is included to model computer and software resources which are not in use. At time zero all of the candidate computer and software resources are in the dead state 501. Let $S_i = \{0,1,2,3\}$ represent the state space of a computer and software resource life cycle process. The state of the computer and software resource portfolio is expressed as the collection of the life cycles of the individual computer and software resources that compose the portfolio, $\overline{X}_n = (X_n^i, \ldots, X_n^K)$ The stochastic process, $\{\overline{X}_n | n \geq 0\}$ is again a Markov chain and let $\overline{S} = S_1 \times S_2 \times \ldots \times S_K$ be the state space of the computer and software resource portfolio.

At time n the portfolio manager must choose an action for each member of the portfolio. Let $a_n^i$ be the action applied to the i-th resource at the time n. In this embodiment, the set of resource actions, A, is {Retain, Restructure, Retire}. In another embodiment, additional actions may exist. A portfolio action is defined to be the vector of all resource actions, $\overline{a}_n = (a_n^i, \ldots, a_n^K)$ The space of portfolio action is $\overline{A} = A_1 \times A_2 \times \ldots \times A_K$. The portfolio transition plan is the set of portfolio actions for the entire time horizon, $\overline{a} = (\overline{a}_n | 0 \leq n \leq N)$.

Figure 6A:
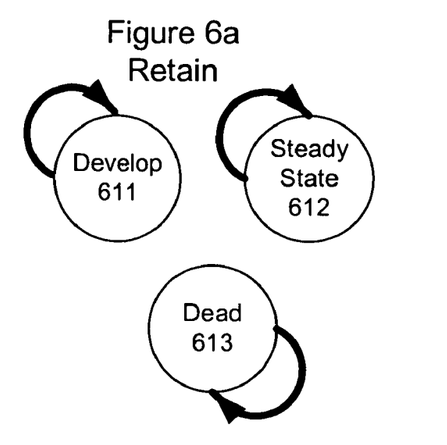
FIG. 6a shows the state transitions for a retain action.

FIG. 6a shows the Retain action of state transitions. The retain action 6a keeps the computer and software in the current phase of its life cycle until the beginning of the next decision period. That is, Develop 611, Steady State 612 and Dead 613 do not transition to any other state.

Figure 6B:
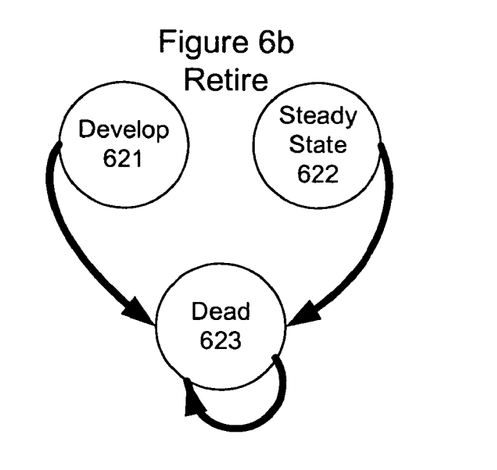
FIG. 6b shows the state transitions for a retire action.

FIG. 6b illustrates the Retire action. The retire action sends a computer and software resources to the dead state 623. The Develop 621 and Steady State 622 will transition to Dead 623. The computer and software is effectively removed from the portfolio.

Figure 6C:
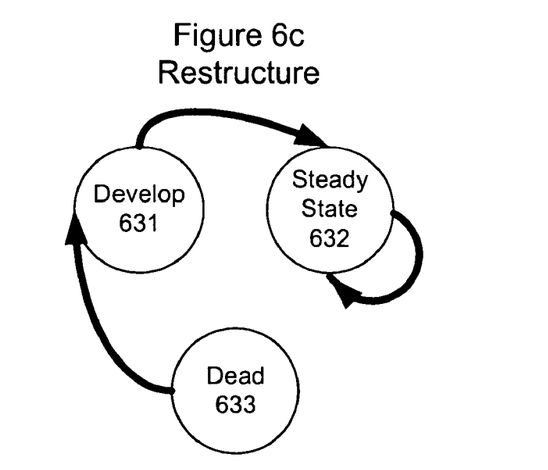
FIG. 6c shows the state transitions for a restructure action.

FIG. 6c illustrates the Restructure action. The restructure action sends the computer and software resource back to the previous life cycle phase. That is, Dead 633 is transitioned back to Develop 631 while Develop 631 is transitioned to Steady State 632. Restructuring a computer and software resource more than once does not add value to the computer and software resource, thus Steady State 632 is shown as remaining in the steady state phase. Restructuring a computer and software resource simply causes a computer and software resource to perform up to its target capabilities (e.g., version updates, etc.). This assumption ensures that the rewards are Markovian. The discrete time assumption implies that the actions are recommended at known instances of time called decision periods. Each recommendation is executed completely during a decision period.

A portfolio action modifies the life cycle process of the computer and software resource. In particular, a computer and software resource action performed on resource i, modifies the life cycle transition probabilities of only that resource. Given a resource action for resource i, the state transition of the i-th resource is independent of the resource actions performed on the other computer and software resources of the portfolio.

As previously mentioned, members of the portfolio are understood to be the computer and software resources selected for the transition management. The terms member, member of the portfolio, computer and software resources, and resources are used interchangeably throughout the description of the invention embodiment. In addition, for the purposes of this invention, the term computer and software resources is used to describe the members of the portfolio. However, it should be understood that the members of the portfolio could be either computer or software resources or both computer and software resources. For simplicity, the term computer and software resources or just resources is used throughout the description of the embodiment of the invention.

Figure 7:
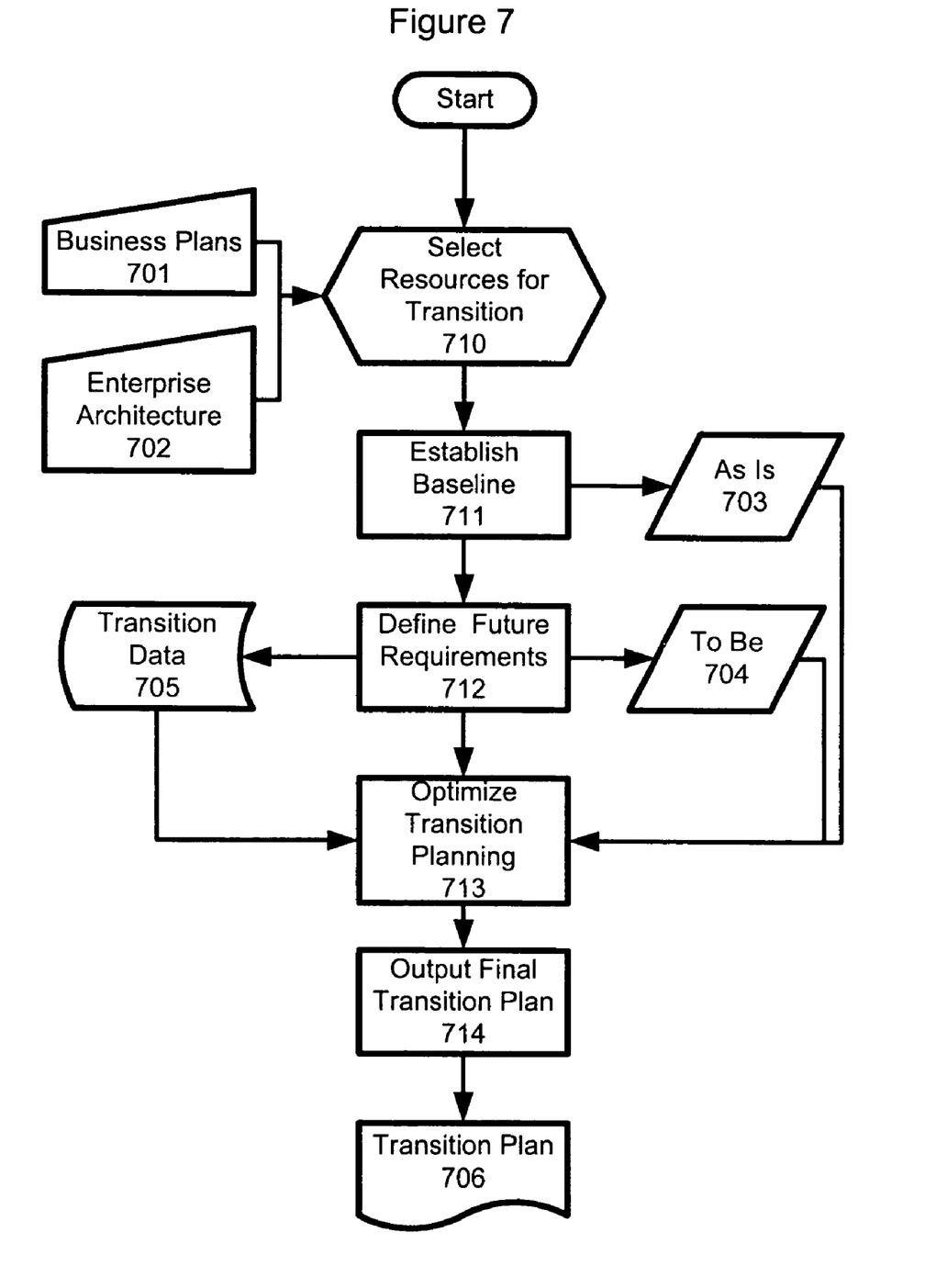
FIG. 7 is a flowchart describing the high level portfolio management methodology.

Referring now to FIG. 7, the portfolio transition management system can be described by the flowchart shown. The system inputs data from business plans 701 and from the enterprise architecture 702. The outputs include the AS IS 703 capabilities and the TO BE 704 requirements. The portfolio transition manager may decide to develop a transition plan for a set of computer and software resources within the enterprise. Using the Business Plan 701 and Enterprise Architecture 702 as some of the inputs, the computer and software targeted for transition are select at 710. The selection of these resources can be done manually by the portfolio transition manager and may include resources across the enterprise, computer and software resources only within a specific unit of the enterprise, only existing computer and software resources, only new computer and software resources, or any combination of the aforementioned or other groups.

Once the computer and software resources have been selected, an assessment is made of the existing capabilities of the target computer and software resources and the baseline of capabilities is established at 711. This baseline is expressed as AS IS 703 capabilities and can be stored on a database within the enterprise. The system then considers the future requirements as expressed through the enterprise architecture 702 and business plans 701 and defines future requirements for each of the selected computer and software resources at 712. The expression $\{S_j(X_n^i, a_n^i)|0 \leq j \leq K\}$ captures the functional requirements of the enterprise architecture in terms of TO BE 704 requirements. The $S_j$ represents the risk adjusted business value associated with each life cycle phase of a resource at the final time. The expression defines the TO BE 704 requirements in terms of the risk adjusted business value associated with each life cycle phase, the iterative state of a life cycle of the i-th resource $[X_n^i]$, and the actions $[a_n^i]$ to be performed to achieve the life cycle state over the planning period ($0 \leq n \leq N$)., where the current decision period is n and the number of decision periods is N. These future requirements, expressed as TO BE 704, can also be stored on an enterprise database (251, 252), within the enterprise computer systems (241, 242), or within any of the other computing elements discussed in FIG. 2.

Figure 8:
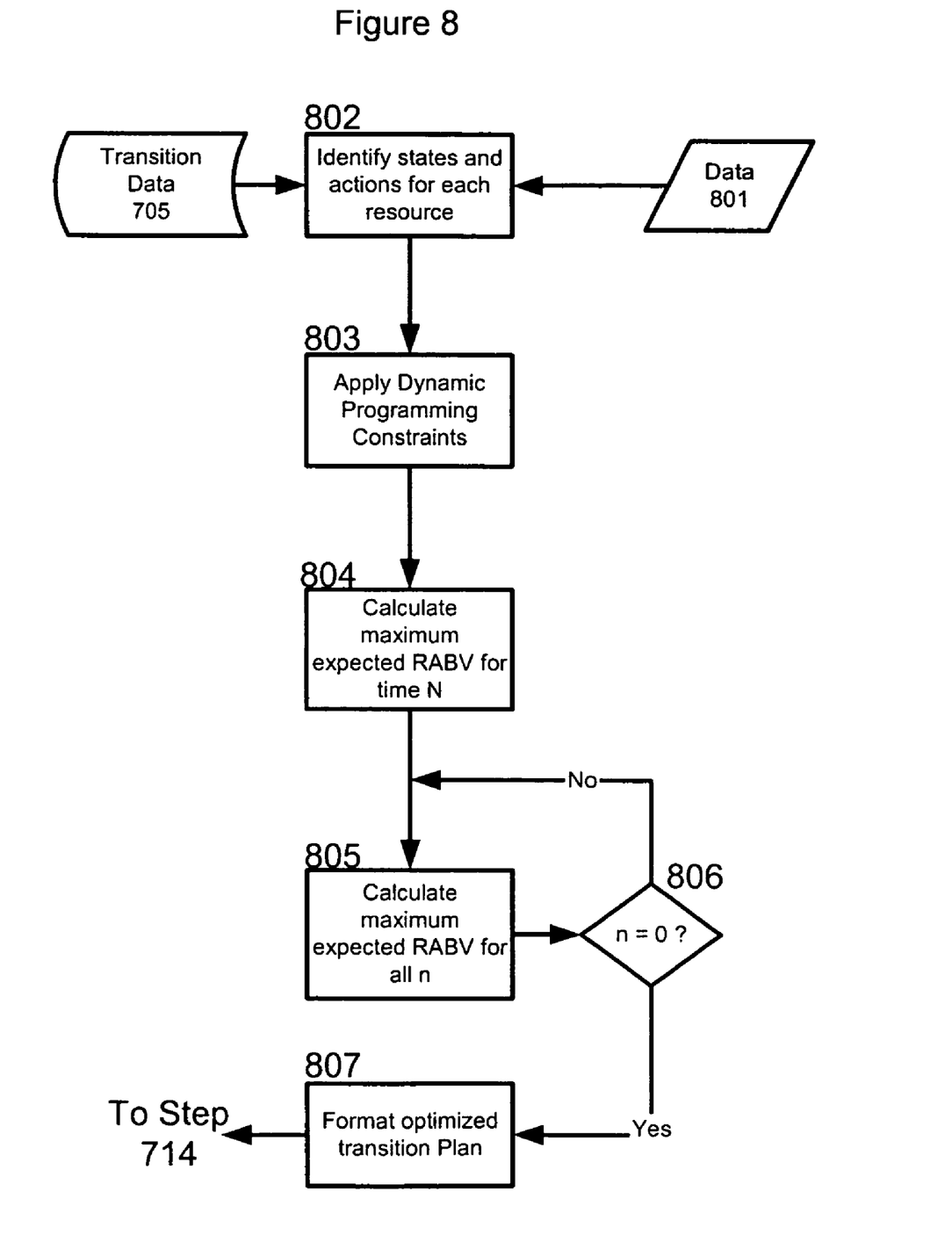
FIG. 8 is a flowchart of the optimization step.

The collection of the AS IS 703 capabilities and the TO BE 704 requirements are then formatted with the specific targeted computer and software resources and outputted as transition data 705 to be stored in an enterprise database (251, 252), within the other enterprise computer systems (241, 242) or within any of the other computing elements discussed in FIG. 2. Once the transition data 705 has been created, the transition planning is optimized at 713. This optimization is performed to maximize the business value for enterprise portfolio of computer and software resources. FIG. 8 describes the optimization step 613 in more detail.

Once the transition plan is optimized at 713 the data is outputted at 614 as a physical report called the Transition Plan 706 or can be distributed electronically across the enterprise through the network or can be printed for manual distribution.

FIG. 8 provides a description of the optimization step 713 of FIG. 7. The transition data 705 (from FIG. 7) and the requirements data 801 (to include AS IS 703 and TO BE 704 of FIG. 6) is inputted and the states and actions relationships for each computer and software resource are identified at step 802. The relationship between states and actions for the subject invention is defined by a dynamic programming algorithm.

The computational requirements of the dynamic programming algorithm grow exponentially with the number of states of resources in the portfolio. For each time period the objective function is computed for each of the |S| states, during which a search over |A| actions is performed and for each action the future cost is calculated for each of the |S| possible state transitions. The number of multiplications required for the dynamic programming algorithm is $(N-1)|\overline{A}||\overline{S}|^2$. Thus, the life cycle states and set of related actions for each resource are defined as |S| and |A|, respectively for step 802.

Modeling the enterprise portfolio become more accurate as the number of resources in the portfolio grows large, where K represents the number of resources. However dynamic programming becomes less efficient as the number of computations grow. The subject invention, therefore, applies constraints to the dynamic programming at step 803 to reduce the total number of states and related sets of actions for which the maximum expected RABV is calculated at step 804. The two constraints introduced at step 803 are operational continuity and project capacity. These two constraints lead to a reduction in the state space and the action space presented for maximizing the expected RABV.

The computational requirement of the dynamic programming algorithm grows twice as fast in the number of states as the number of actions. Thus the first approximation to the algorithm will prune the number of feasible states. To accomplish this, an operational continuity constraint is introduced. This constraint assumes that the enterprise desires to remain operational throughout the entire portfolio management process.

The main capabilities of an enterprise should not be interrupted by the enterprise portfolio transition management process. Thus, the enterprise should be able to operate at all times throughout the enterprise portfolio transition management process. The possible states of the portfolio are constrained by these capability requirements. This reduces the set of possible states that the enterprise portfolio may attain. Each computer and software resource may support one or more capabilities. Let C be the number of capabilities of an enterprise. The S by C matrix, called $[G^{(i)}]$ represents the capabilities support by resource i for each life cycle phase. The matrix $G^{(i)}$ is a zero or one matrix. The entry $G_{kj}^{(i)}$ is zero if the i-th resource in state k supports capability j and is equal to one otherwise. An resource may support more than one capability. The operational continuity assumption implicitly constrains the space of feasible actions.

To reduce the computational effort needed to solve this problem, the subject invention assumes that an enterprise has a tolerance or threshold on the number of computer and software resources it is willing to change over a given decision period. This is to say that the enterprise is capacitated in some way. The resulting dynamic programming problem will be called the capacitated dynamic programming problem. Because of constraints on funding, man power and management complexity, an enterprise may want to limit the number of projects that it is undertaking over in given decision period.

At this point, the subject invention has now defined the constrained number of states and the constrained set of actions which are to be considered to achieve the maximum risk adjusted business value (RABV). These constrained sets of actions and life cycle states are provided as inputs to step 804.

Once these states and sets of actions are defined, the cumulative risk adjusted business value is calculated using the expression $$J_N^{\bar{a}} = \sum_{n=1}^{N-1} \beta^{n-1} Z_n + \beta^N \sum_{j=1}^{K} S_j(X_N^j). \quad (1)$$

This expression assumes that the planning horizon has N decision periods and uses the constrained set of portfolio actions and life cycle states across the time horizon $\bar{a}=(\bar{a}_n|0 \leq n \leq N)$ where $(X_N^j)$ are the constrained set of actions from step 803 and $S_j$ are the constrained life cycles states from step 803 and $Z_n$ is the risk adjusted business value (RABV) at each decision period.

Once the states and related actions have been identified and constrained, the maximum expected RABV is calculated for time N at step 804. The objective of enterprise portfolio transition is to maximize the expected total Discounted Risk adjusted business value $$\max_{\bar{a} \in \bar{A}} E\,[J_N^{\bar{a}}]. \quad (2)$$

This relationship applies to the final set of actions and states at time N. In order to identify the sets of actions and life cycle states for each decision period that maximize the RABV, the functional recursive equation is then:

$$f_n(\bar{x}) = \max_{\bar{a}_n \in A} E\{Z_n + \beta f_{n+1}(\bar{x})\} \quad (3)$$
$$= \max_{\bar{a}_n \in A} \{Z_n + \beta E[f_{n+1}(\bar{x})]\}$$
$$= \max_{\bar{a}_n \in A} \left\{ Z_n + \beta \sum_{j \in S} p_{\bar{x}\bar{j}}^{\bar{a}} f_{n+1}(\bar{j}) \right\}$$
$$= \max_{\bar{a}_n \in A} \left\{ Z_n + \beta \sum_{j \in S} p_{x_1 j_1}^{a_n^1} \cdot p_{x_2 j_2}^{a_n^2} \cdots p_{x_K j_K}^{a_n^K} \cdot f_{n+1}(\bar{j}) \right\}$$

where:

$$f_N(\bar{x}) = \sum_{j=1}^{K} S_j(x_N^j) \quad (4)$$

The backward induction technique is used to solve the recursive formula. Starting at n=N $f_N(\bar{x})$ is known for every state $\bar{x}$. Next, $f_{N-1}(\bar{x})$ is computed for every state $\bar{x}$ using the fact that $f_N(\bar{x})$ which is known. The optimal actions at N−1 are obtained and saved when $f_{N-1}(\bar{x})$ is computed at step 805. This recursive procedure is continued until n=0 as tested in step 806. The quantity $f_0(\bar{x})$ represents the optimal RABV starting from initial state $\bar{x}$. The set of actions and associated life cycle states that adhere to the maximum RABV are those states and sets of actions that are provided to step 807 where the transition data is formatted in the transition plan at step 807 and the optimized transition plan proceeds to step 714 of FIG. 7.

In essence, the subject invention develops the future TO BE requirements in terms of all possible sets of actions and related life cycle states. The number of possible actions and life cycle states are constrained, that is reduced through the dynamic programming algorithms. These constrained states and actions are used to calculate the RABV for each decision period. Finally, the subject invention, using a backward induction technique, selects the optimum states and sets of actions in order to maximize the RABV across all the selected computer and software resources.

While the invention has been described for a preferred embodiment, those skilled in the art will recognize that the invention can be practiced with modification within the spirit and scope of the appended claims.

What we claim as new and desire to secure by Letters Patent is as follows:

1. A computer implemented method for generating a transition plan for an enterprise portfolio of computer resources, the computer performing the steps of:

storing in a computer memory an inventory data representing each of a plurality of computer resources available to an enterprise, wherein said inventory data includes, for each of said computer resources, a baseline set of current computer resource capabilities, wherein each of said computer resources has an associated state data representing its state within a life cycle state space including a develop state, a steady state and a dead state;

providing a set of enterprise strategic goals for transitioning the enterprise portfolio of computer resources;

translating said enterprise strategic goals into a set of future computer resource requirements for at least one of said computer resources;

forming an initial transition plan, comprising actions pertaining to at least one of said computer resources, for transitioning from said current computer resource capabilities to said future computer resource requirements, based on said current computer resource capabilities and said future computer resource requirements, wherein said actions include a retain action, a retire action and a restructure action, and wherein said actions transition the associated state data of said computer resource among states within said life cycle state space;

generating an optimized transition plan of actions pertaining to at least one of said computer resources for transitioning from said current computer resource capabilities to said future computer resource requirements, said generating including optimizing said initial transition plan; and outputting the optimized transition plan, wherein said translating said enterprise strategic goals into one or more future computer resource requirements is based on the expression $$\{S_j(X_n^i, a_n^i) | 0 \leq j \leq K\}$$

where n represents a specific time period among said N time periods, $S_j$ represents said future computer resource requirements, $X_n^i$ represents the state, within said life cycle state space, of an i-th resource in said enterprise portfolio of computer resources at time n, $a_n^i$ represents an action applied to said i-th resource at time n and, K represents a total number of said computer resources, and wherein said optimizing said initial transition plan includes selecting a sequence of actions based on maximizing a business value for said enterprise portfolio of computer resources, wherein said maximizing bases the business value of each computer resource on:

the state of said computer resource within said life cycle state space,
a set of actions for transitioning said computer resource among states within said life cycle state space, and
a reward for each of said actions, wherein said reward is a cost associated with carrying out said action;
wherein said optimizing initial transition plan includes a backward inductive maximization to maximize said business value for said enterprise portfolio of computer resources based on the algorithm:

$$J_N^{\bar{a}} = \sum_{n=1}^{N-1} \beta^{n-1} Z_n + \beta^N \sum_{j=1}^{K} S_j(X_N^j)$$

$$\bar{a} = (\bar{a}_n) | 0 \leq n \leq N)$$

where,
$\bar{a}$ represents a portfolio transition plan as a set of portfolio actions for the an entire time horizon, each portfolio action being a set of actions, each action corresponding to at least one computer resource of said enterprise portfolio,
$J_N^{\bar{a}}$ represents a cumulative adjusted business value,
N represents a number of time periods considered for said transition plan,
$X_N^j$ represents an iterative state of a life cycle of an i-th resource in said enterprise portfolio of computer resources,
$Z_n$ is a risk adjusted business value at each decision period, and
$\bar{a}_n$ represents portfolio actions to be performed at the n-th time period.

2. A computer implemented system for managing a portfolio of computer and software resources, said computer system having software modules stored thereon and having a processor operable to execute the software modules, the respective software modules comprising computer instructions for:
generating a transition plan for an enterprise portfolio of computer resources, comprising:
storing in a computer memory operatively connected to the processing system an inventory data representing each of a plurality of computer resources available to an enterprise, wherein said inventory data includes, for each of said computer resources, a baseline set of current computer resource capabilities, wherein each of said computer resources has an associated state data representing its state within a life cycle state space including a develop state, a steady state and a dead state;
providing a set of enterprise strategic goals for transitioning the enterprise portfolio of computer resources;
translating said enterprise strategic goals into a set of future computer resource requirements for at least one of said computer resources;
forming an initial transition plan, comprising actions pertaining to at least one of said computer resources, for transitioning from said current computer resource capabilities to said future computer resource requirements, based on said current computer resource capabilities and said future computer resource requirements, wherein said actions include a retain action, a retire action and a restructure action, and wherein said actions transition the associated state data of said computer resource among states within said life cycle state space;
generating an optimized transition plan of actions pertaining to at least one of said computer resources for transitioning from said current computer resource capabilities to said future computer resource requirements, said generating including optimizing said initial transition plan; and
outputting the optimized transition plan,
wherein said translating said enterprise strategic goals into one or more future computer resource requirements is based on the expression $$\{S_j(X_n^i, a_n^i) | 0 \leq j \leq K\}$$

where
n represents a specific time period among said N time periods,
$S_j$ represents said future computer resource requirements,
$X_n^i$ represents the state, within said life cycle state space, of an i-th resource in said enterprise portfolio of computer resources at time n,
$a_n^i$ represents an action applied to said i-th resource at time n and,
K represents a total number of said computer resources, and
wherein said optimizing said initial transition plan includes selecting a sequence of actions based on maximizing a business value for said enterprise portfolio of computer resources, wherein said maximizing bases the business value of each computer resource on:
the state of said computer resource within said life cycle state space,
a set of actions for transitioning said computer resource among states within said life cycle state space, and
a reward for each of said actions, wherein said reward is a cost associated with carrying out said action.

3. A computer implemented system for managing a portfolio of computer and software resources, said computer system having software modules stored thereon and having a processor operable to execute the software modules, the respective software modules comprising computer instructions for:
generating a transition plan for an enterprise portfolio of computer resources, comprising:
storing in a computer memory operatively connected to the processing system an inventory data representing each of a plurality of computer resources available to an enterprise, wherein said inventory data includes, for each of said computer resources, a baseline set of current computer resource capabilities, wherein each of said computer resources has an associated state data representing its state within a life cycle state space including a develop state, a steady state and a dead state;
providing a set of enterprise strategic goals for transitioning the enterprise portfolio of computer resources;
translating said enterprise strategic goals into a set of future computer resource requirements for at least one of said computer resources;
forming an initial transition plan, comprising actions pertaining to at least one of said computer resources, for transitioning from said current computer resource capabilities to said future computer resource requirements, based on said current computer resource capabilities and said future computer resource requirements, wherein said actions include a retain action, a retire action and a restructure action, and wherein said actions transition the associated state data of said computer resource among states within said life cycle state space;

generating an optimized transition plan of actions pertaining to at least one of said computer resources for transitioning from said current computer resource capabilities to said future computer resource requirements, said generating including optimizing said initial transition plan; and outputting the optimized transition plan, wherein said translating said enterprise strategic goals into one or more future computer resource requirements is based on the expression $$\{S_j(X_n^i, a_n^i) | 0 \leq j \leq K\}$$

where n represents a specific time period among said N time periods, $S_j$ represents said future computer resource requirements, $X_n^i$ represents the state, within said life cycle state space, of an i-th resource in said enterprise portfolio of computer resources at time n, $a_n^i$ represents an action applied to said i-th resource at time n and, K represents a total number of said computer resources, and wherein said optimizing said initial transition plan includes selecting a sequence of actions based on maximizing a business value for said enterprise portfolio of computer resources, wherein said maximizing bases the business value of each computer resource on:

the state of said computer resource within said life cycle state space, a set of actions for transitioning said computer resource among states within said life cycle state space, and a reward for each of said actions, wherein said reward is a cost associated with carrying out said action, wherein said instructions for optimizing initial transition plan include instructions for a backward inductive maximization to maximize said business value for said enterprise portfolio of computer resources based on the algorithm:

$$J_N^{\bar{a}} = \sum_{n=1}^{N-1} \beta^{n-1} Z_n + \beta^N \sum_{j=1}^{K} S_j(X_N^j)$$

$$\bar{a} = (\bar{a}_n | 0 \leq n \leq N)$$

where, $\bar{a}$ represents a portfolio transition plan as a set of portfolio actions for the an entire time horizon, each portfolio action being a set of actions, each action corresponding to at least one computer resource of said enterprise portfolio, $J_N^{\bar{a}}$ represents a cumulative adjusted business value, N represents a number of time periods considered for said transition plan, $X_N^j$ represents an iterative state of a life cycle of an i-th resource in said enterprise portfolio of computer resources, $Z_n$ is a risk adjusted business value at each decision period, and $\bar{a}_n$ represents portfolio actions to be performed at the n-th time period.

* * * * *